United States Patent [19]

Schröder

[11] Patent Number: 4,623,294

[45] Date of Patent: Nov. 18, 1986

[54] APPARATUS FOR CARRYING OUT REPAIR, MAINTENANCE OR TESTING OF APPARATUS, COMPONENTS AND THE LIKE IN HOT CELLS

[75] Inventor: Günter Schröder, Wetter, Fed. Rep. of Germany

[73] Assignee: Deutsche Gesellschaft, Fed. Rep. of Germany

[21] Appl. No.: 675,773

[22] Filed: Nov. 28, 1984

Related U.S. Application Data

[62] Division of Ser. No. 421,716, Sep. 22, 1982, Pat. No. 4,526,311.

[30] Foreign Application Priority Data

Sep. 8, 1982 [DE] Fed. Rep. of Germany ..... 31384846

[51] Int. Cl.$^4$ .............................. B23Q 7/00
[52] U.S. Cl. ...................... 414/590; 901/8; 901/17; 901/44; 29/402
[58] Field of Search ............... 29/402; 901/8, 17, 44, 901/6; 165/76; 414/590, 4, 7

[56] References Cited

U.S. PATENT DOCUMENTS

| | | |
|---|---|---|
| 2,978,118 | 4/1961 | Goertz et al. ............... 414/7 |
| 3,077,361 | 2/1963 | Tait et al. . |
| 3,114,799 | 12/1963 | Waters et al. . |
| 3,780,571 | 12/1973 | Wiesener ............... 901/44 X |
| 3,914,613 | 10/1975 | Shallenberger et al. . |
| 3,943,756 | 3/1976 | Aubert et al. . |
| 4,169,758 | 10/1979 | Blackstone et al. . |
| 4,173,060 | 11/1979 | Massaro, Jr. et al. . |
| 4,174,999 | 11/1979 | Burns . |
| 4,192,053 | 3/1980 | Blanco et al. . |
| 4,196,049 | 4/1980 | Burns et al. .............. 901/17 X |
| 4,205,939 | 6/1980 | Reyes . |
| 4,205,940 | 6/1980 | Golick . |
| 4,216,893 | 8/1980 | Glatthorn . |
| 4,217,173 | 8/1980 | Jabsen . |
| 4,231,419 | 11/1980 | Gugel . |
| 4,311,556 | 1/1982 | Iwamoto et al. . |
| 4,347,652 | 9/1982 | Cooper, Jr. et al. . |
| 4,359,815 | 11/1982 | Toyoda ............... 901/6 X |
| 4,377,551 | 3/1983 | Adams . |
| 4,406,856 | 9/1983 | Wilkins et al. . |
| 4,439,905 | 4/1984 | Gourdon et al. . |
| 4,541,770 | 9/1985 | Niinomi et al. ............... 901/8 X |

FOREIGN PATENT DOCUMENTS

| | | |
|---|---|---|
| 0012655A1 | 6/1980 | European Pat. Off. . |
| 1454491 | 11/1976 | United Kingdom . |
| 1573593 | 8/1980 | United Kingdom . |
| 2064059 | 6/1981 | United Kingdom . |
| 1597273 | 9/1981 | United Kingdom . |

OTHER PUBLICATIONS

"Robotics", The Engineer, 11/1977, pp. 65-67.
Compton, "Tools and Recovery Equipment", *Proceedings of the Joint International Meeting on Active Working on Reactors*, Session 2, Paper 7, London, England (Oct. 1, 1970), pp. 47-56.

*Primary Examiner*—Terrance L. Siemens
*Attorney, Agent, or Firm*—Allegretti, Newitt, Witcoff & McAndrews, Ltd.

[57] ABSTRACT

An apparatus is disclosed for carrying out repair, maintenance or testing of apparatus, components and the like in hot cells, more particularly hot cells of reprocessing plants for spent nuclear fuels. The position of damage zones is detected and ascertained with the use of coordinates. Replacement parts and tools are moved into the maintenance and work position in dependence upon the coordinate data, and the repair of maintenance work is automatically carried out under computer control, with remote operation and remote monitoring. For carrying out the work, computer-controlled handling machines and manipulators are used which are adapted to travel in controllable manner in the hot cell. The monitoring and detecting, using coordinates, of damage zones and defects may be carried out with the use of cameras and/or leak detectors.

8 Claims, 2 Drawing Figures

APPARATUS FOR CARRYING OUT REPAIR, MAINTENANCE OR TESTING OF APPARATUS, COMPONENTS AND THE LIKE IN HOT CELLS

BACKGROUND OF THE INVENTION

1. Field of the Invention

This application is a division of copending application Ser. No. 421,716, filed Sept. 22, 1982, now U.S. Pat. No. 4,526,311. The invention relates to a method for carrying out repair or maintenance or testing of apparatus, components and the like, in hot cells, such as in reprocessing plants for spent nuclear fuels, and to apparatus for carrying out the method.

2. Description of the Prior Art

The repair, assembly, disassembly, servicing or maintenance of apparatus, equipment and components or the treatment of components in rooms or chambers subjected to radioactive radiation, more particularly so-called hot cells in reprocessing plants for spent nuclear fuels, has hitherto required a considerable outlay in running expenses. The hot cells have to be decontaminated first before persons can enter them to carry out the necessary work, and extensive safety measures are needed which involve considerable expense.

SUMMARY OF THE INVENTION

It is an object of the present invention to provide a method for carrying out repair, maintenance (including servicing) or testing of apparatus, components and the like in hot cells, more particularly of reprocessing plants for spent nuclear fuels, so as to make decontamination work unnecessary. This allows maintenance to be carried out more quickly, more simply and more safely. It is also an object of the present invention to provide an apparatus for carrying out the method.

According to one aspect of the present invention there is provided a method of carrying out repair, maintenance or testing of apparatus, components and the like in a hot cell using one or more handling machines, machine tools, general tools, replacement parts, working materials and testing devices, provided for such a purpose in the hot cell. The apparatus, components and the like are monitored for damage and defects and the position of the damage or defects is detected and ascertained with the use of co-ordinates. The appropriate handling machines, machine tools, general tools, replacement parts, working materials and testing devices are selected and moved into a servicing and working position controlled by the ascertained co-ordinates. Thereafter the necessary repair or maintenance work can be carried out manually or automatically with the use of remote operation and remote monitoring, whereby defective parts may be removed and replaced or repaired.

According to another aspect of the present invention there is provided apparatus for carrying out the method described above with apparatus, components and the like arranged in stands and holders in a hot cell. At least one central controllable manipulator is arranged in the hot cell and is mounted so as to be capable of horizontal and vertical travel and also of rotary or pivotal movement. This manipulator is arranged to cooperate with each of a plurality of further controllable side manipulators which are arranged to be capable of horizontal travel. These manipulators are vertically spaced from one another. Monitoring devices are provided for ascertaining damage or defect zones, by means of which the position coordinates of the damage or defect zones can be ascertained and given to a computer which is situated outside the hot cell and which is connected by means of control lines to the manipulators.

Preferably, the central manipulator is arranged on a T-shaped support vehicle. This vehicle substantially comprises a transverse support mounted so as to be capable of travelling horizontally on wheels laterally on opposite walls of the hot cell, and a vertical column central supporting the transverse support. The column is provided at the lower end with a wheel running on the floor or a floor rail of the hot cell. The support vehicle comprising at least one support arm for accommodating the central manipulator.

Alternatively, the central manipulator is transportable on a lorry-like support vehicle which runs on rails fixed to the cell floor and which has a central column. This column is supported by a gantry-like frame and carries a support arm on which the central manipulator is mounted so as to be capable of being fixed before work.

In each case the support arm may be arranged on the column so as to be capable of moving vertically upwards and downwards and pivotally through 360°. The column itself may be rotatable.

The present invention affords substantial technical and economic advantages. The present method and apparatus for carrying out the method allow safe working in the hot cell and improvement in the quality of the work results. A substantial saving in cost is achieved owing to the improved availability and due to personnel and material savings.

BRIEF DESCRIPTION OF THE DRAWINGS

In order to enable the invention to be more readily understood, reference will now be made to the accompanying drawings which illustrate diagrammatically and by way of example an embodiment of apparatus for carrying out the method of the present invention, and in which.

DESCRIPTION OF THE PREFERRED EMBODIMENT

Figure 1:
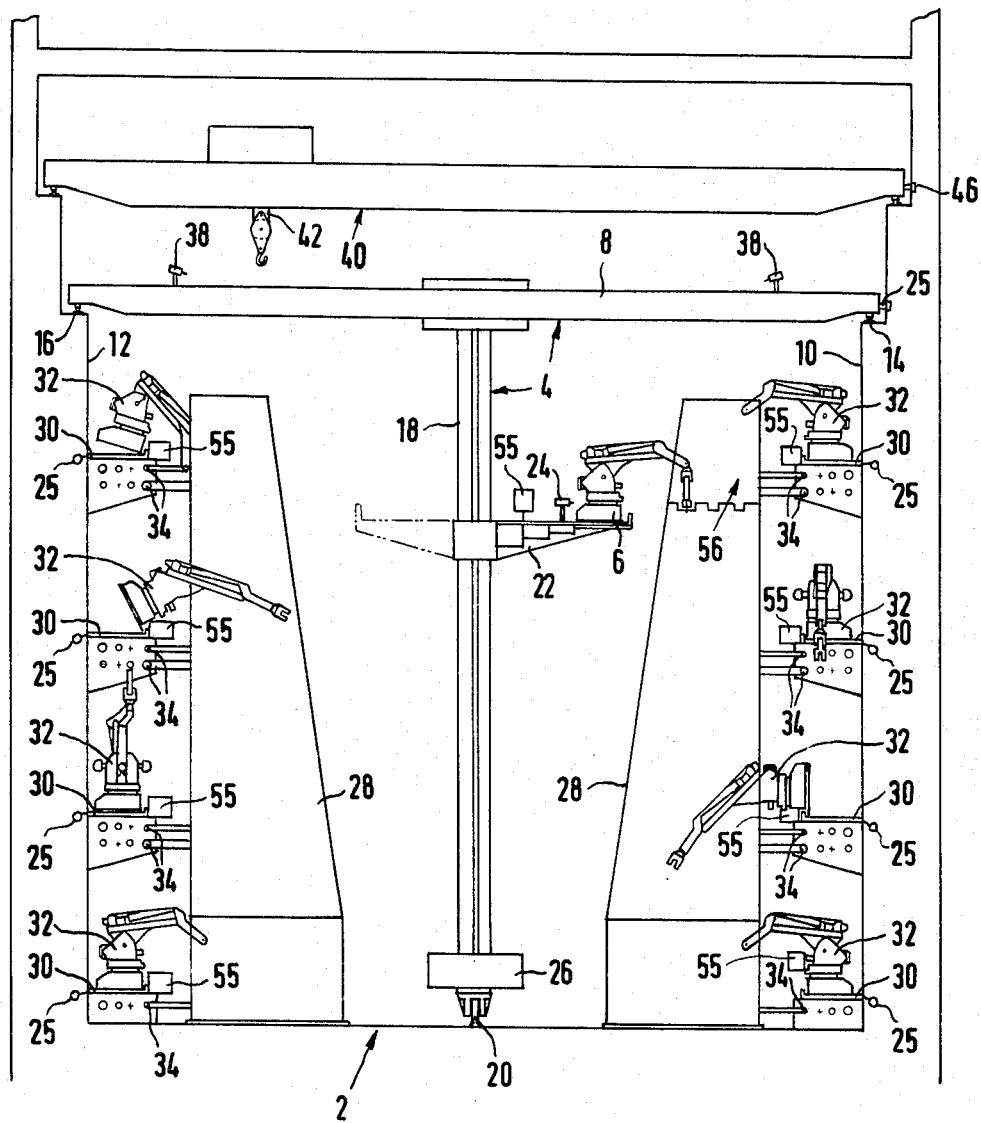
FIG. 1 is a side view of the apparatus.
Figure 2:
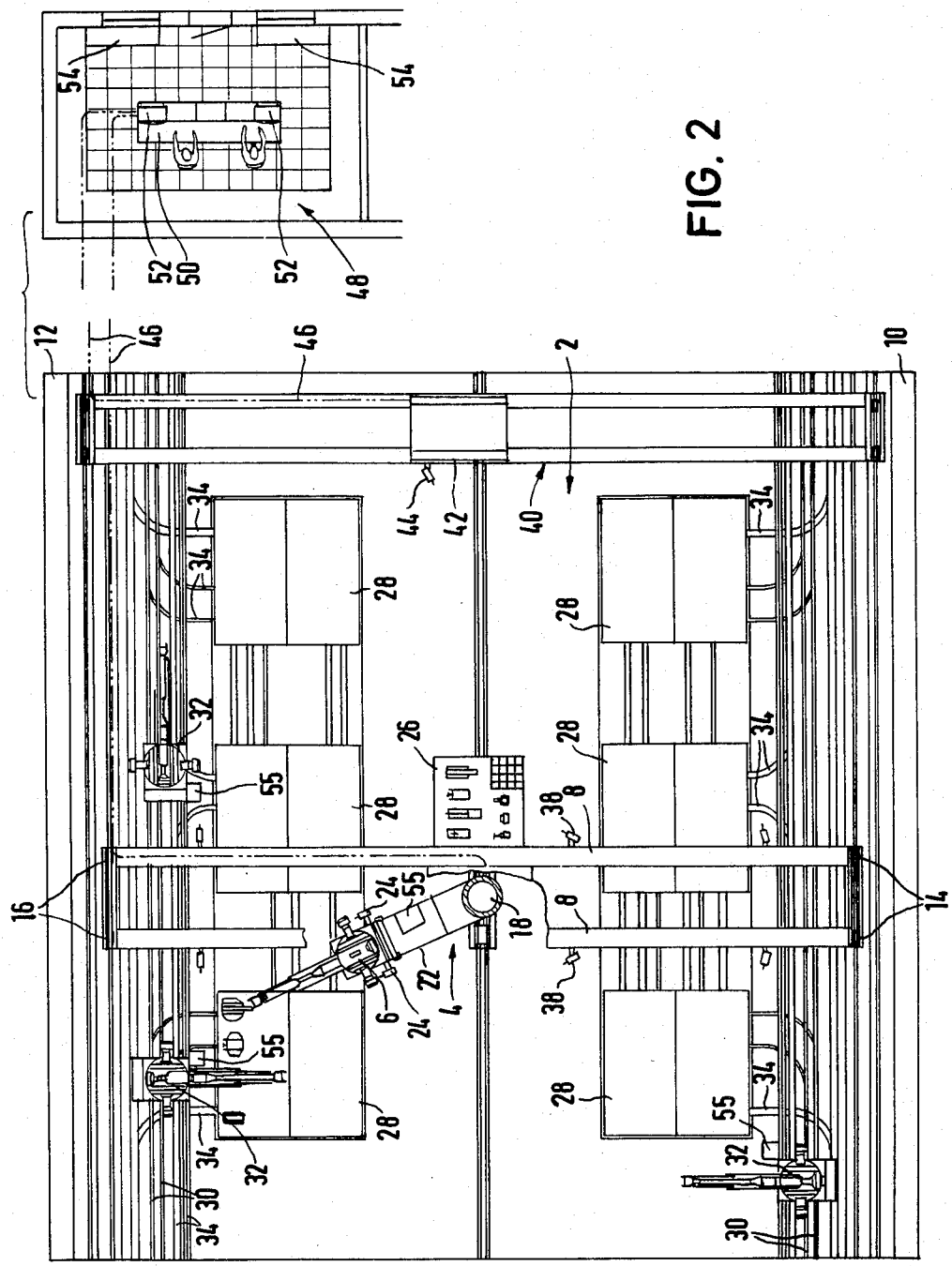
FIG. 2 is a plan view of the apparatus.

Referring now to the drawings, there is shown apparatus in accordance with the invention arranged in a hot cell 2 of a reprocessing plant, the apparatus comprising a T-shaped support vehicle 4 for a central manipulator 6. The support vehicle 4 comprises an upper transverse support 8 which is adapted to run laterally, horizontally, in the side walls 10 and 12 of the hot cell on wheels 14 and 16. Centrally the transverse support 8 is supported by a column 18 comprising at its lower end a wheel 20 running on the floor or on a floor rail of the hot cell. A support arm 22 on which the manipulator 6 is arranged is mounted so as to be capable of travelling upwards and downwards on the column 18. The column 18 is rotatable about its longitudinal axis. Monitoring cameras 24 are arranged on the support arm 22, which may also be arranged to be rotatable on the column. A plurality of central manipulators may also be provided.

The support vehicle 4 and the central manipulator 6 are controlled by means of control cables 25. Within the reach of the manipulator or handling machine there is also arranged on the column 18 an equipment table 26 which carries tools, replacement parts and working materials ready for the central manipulator to take up.

Substantially parallel to the direction of travel of the support vehicle 4 there are arranged at the two sides of the support vehicle 4, along the walls of the hot cell, stands 28 for the process apparatus (not shown) of the reprocessing plant. Between the stands 28 and the walls of the cell there are situated in a plurality of vertically spaced planes horizontally disposed running rails 30 for horizontally mobile manipulators 32 which are each arranged on a mobile carriage or are constructed to be capable of travelling themselves. The manipulators 32 and their carriages are controllable by means of their own control lines. Directly below the manipulators 32 or the running rails 30, conduits 34 are provided for the process apparatus. The process apparatus are connected to one another by further conduits insofar as this is necessary.

Further cameras 38 are arranged on the transverse support 8 of the support vehicle 4.

A crane 40 with a travelling crab or trolley 42 is arranged above the transverse support 8, and supports further cameras (not shown).

The cameras 24, 38 and those not shown serve for monitoring the positioning of the apparatus to be dealt with and more particularly for monitoring the process apparatus and its conduitry.

The entire apparatus in the hot cell 2 is connected by control cables 46 to a monitoring and control room 48, with control desk 50, screens 52 and computers 54, which is situated outside of the cell.

The apparatus operates as follows, and by way of example it will be assumed that a conduit 56 in the right-hand upper level (see FIG. 1) has been found to be defective, for example by means of leak detectors 55 and/or one of the cameras. After ascertaining the position coordinates of the defect zones and the feeding of such coordinates into the computer 54, a repair operation is carried out which is initiated at the control desk 50 and proceeds in an automatically remote-controlled manner, the central manipulator 6 having amongst other things the task of removing the required tool and the required repair material from the equipment table 26 and bringing them to the defect zone. Using the manipulators 6 and 32 and the tools and repair materials which have been brought to the relevant zone, the following repair steps then proceed, automatically remote-controlled by means of the computer or alternatively in manually controlled manner: sawing-out of the defective conduit section, aligning of the two free conduit ends, clamping fast of the two aligned free conduit ends, aligning of the replacement conduit section with the free conduit ends, weld seam preparation, and welding-in of the replacement conduit section.

Even heavy objects can be transported and positioned in the hot cell with the use of the crane 40.

In order to facilitate the monitoring of defects with the use of coordinates and the positioning of the parts and tools needed for repair work, the stands 28 and conduits 34 and also the process apparatus are arranged in accordance with a specific pattern. The manipulators 6 and 32 are so arranged that their working or effective ranges are adjacent one another or overlap one another.

I hereby claim:

1. An apparatus for carrying out repair, maintenance or testing of components in a hot cell, comprising at least one central, controllable manipulator, a plurality of controllable side manipulators, a T-shaped support vehicle, an equipment table, a monitoring device and a control computer, said central manipulator being arranged in the hot cell and mounted so as to be capable of horizontal and vertical travel and also of rotary or pivotal movement, said central manipulator being arranged to cooperate with each of said side manipulators, said side manipulators being capable of horizontal travel, said side manipulators being arranged in a plurality of vertically spaced planes, said monitoring device being capable of ascertaining the position coordinates of damage or defect zones, said monitoring device being in communication with said computer such that said ascertained position coordinates can be fed into said computer, said computer being situated outside the hot cell and being connected by means of control lines to said central manipulator and said side manipulators, said central manipulator being mounted on said T-shaped support vehicle, said T-shaped support vehicle comprising a transverse support and a vertical column centrally supporting said transverse support, said transverse support being capable of horizontal travel with respect to a wall of the hot cell, said vertical column being capable of horizontal travel with respect to a floor of hot cell, said support vehicle additionally comprising at least one support arm on which said central manipulator is mounted, said equipment table being mounted on said vertical column of said support vehicle within reach of said central manipulator, said equipment table being designed to accommodate tools, replacement parts and materials required for carrying out repair and maintenance work in a position such that said tools, replacement parts and materials can be manipulated by said central manipulator.

2. The apparatus of claim 1, wherein the support arm is capable of moving vertically and pivotably.

3. The apparatus of claim 1, wherein the column is rotatable.

4. The apparatus of claim 1, wherein the side manipulators are arranged on rails extending along opposite walls of the cell.

5. The apparatus of claim 1, additionally comprising a horizontally mobile crane arranged above the support vehicle and provided with a travelling crab or trolley which can travel horizontally and transversely with respect to the direction of movement of the crane.

6. The apparatus of claim 5, wherein the central manipulator, the support vehicle, the crane and the side manipulators are connected by supply and control lines to a computer and control desk situated outside the hot cell.

7. The apparatus of claim 1, additionally comprising stands for accommodating said components contained in the hot cell, said stands being arranged between the central manipulator and the side manipulators.

8. The apparatus of claim 1, wherein said monitoring device comprises leak detectors and cameras.

* * * * *